United States Patent
Theodosis et al.

(10) Patent No.: US 10,144,408 B2
(45) Date of Patent: Dec. 4, 2018

(54) SYSTEM AND METHOD FOR ASSISTING NAVIGATION OF VEHICLE THROUGH TRAFFIC

(71) Applicant: Faraday&Future Inc., Gardena, CA (US)

(72) Inventors: Paul Alan Theodosis, Rancho Palos Verdes, CA (US); Kenneth X. Xie, Manhattan Beach, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/418,584

(22) Filed: Jan. 27, 2017

(65) Prior Publication Data

US 2017/0217421 A1    Aug. 3, 2017

Related U.S. Application Data

(60) Provisional application No. 62/288,963, filed on Jan. 29, 2016.

(51) Int. Cl.
*B60W 10/20* (2006.01)
*B60W 50/14* (2012.01)
(Continued)

(52) U.S. Cl.
CPC ............ *B60W 10/20* (2013.01); *B60W 50/14* (2013.01); *G06K 9/00845* (2013.01);
(Continued)

(58) Field of Classification Search
CPC ......... G01L 15/22; G06F 9/44; B60R 16/037; G06Q 40/08
(Continued)

(56) References Cited

U.S. PATENT DOCUMENTS 8,612,131 B2    12/2013  Gutierrez et al.
8,842,021 B2    9/2014   Behm et al.
(Continued)

OTHER PUBLICATIONS

Fernández, C. et al. (Oct. 23, 2012). "Autonomous Navigation and Obstacle Avoidance of a Micro-bus," INTECH, International Journal of Advanced Robotic Systems, vol. 10, www.intechopen.com, nine pages.

(Continued)

*Primary Examiner* — Thomas G Black
*Assistant Examiner* — Wae L Louie
(74) *Attorney, Agent, or Firm* — Morrison & Foerster LLP

(57) ABSTRACT

The preferred embodiments of the present invention are directed to systems and methods for assisting vehicular navigation through traffic. In one example, while a first vehicle is stopped, first data is received from a first set of sensors mounted on the first vehicle, the first data indicative of a state of traffic surrounding the first vehicle, and second data is received from a second set of sensors mounted on the first vehicle, the second data indicative of a state of attention of a driver of the first vehicle. Whether the first data and the second data satisfy indication-generation criteria, including a criterion that is satisfied when the second data indicates that the driver is distracted, is determined. In accordance with a determination that the first data and the second data satisfy the indication-generation criteria, the driver of the first vehicle is provided an indication to proceed into a region of a road.

16 Claims, 7 Drawing Sheets

(51) Int. Cl.
  *G08G 1/096* (2006.01)
  *G08G 1/0962* (2006.01)
  *G06K 9/00* (2006.01)

(52) U.S. Cl.
  CPC ......... *G08G 1/096* (2013.01); *G08G 1/09623* (2013.01); *G08G 1/09626* (2013.01); *B60W 2420/42* (2013.01); *B60W 2710/20* (2013.01); *B60W 2750/30* (2013.01)

(58) Field of Classification Search
  USPC .......................................................... 701/36
  See application file for complete search history.

(56) References Cited

U.S. PATENT DOCUMENTS

| | | | | |
|---|---|---|---|---|
| 8,993,951 | B2* | 3/2015 | Schofield | G05D 1/0244 |
| | | | | 250/208.1 |
| 9,789,813 | B2* | 10/2017 | Gralto | B60W 40/105 |
| 2008/0085686 | A1 | 4/2008 | Kalik | |
| 2009/0119014 | A1 | 5/2009 | Caplan | |
| 2013/0300871 | A1* | 11/2013 | Schofield | G05D 1/0244 |
| | | | | 348/148 |
| 2014/0309806 | A1* | 10/2014 | Ricci | B60Q 1/00 |
| | | | | 701/1 |
| 2014/0309864 | A1* | 10/2014 | Ricci | H04W 4/21 |
| | | | | 701/36 |
| 2015/0294422 | A1* | 10/2015 | Carver | G06Q 40/08 |
| | | | | 705/4 |
| 2016/0086285 | A1* | 3/2016 | Jordan Peters | G06Q 40/08 |
| | | | | 705/4 |
| 2017/0075701 | A1* | 3/2017 | Ricci | H04W 4/21 |
| 2017/0140757 | A1* | 5/2017 | Penilla | H04L 67/12 |
| 2017/0200449 | A1* | 7/2017 | Penilla | H04L 67/12 |
| 2017/0205825 | A1 | 7/2017 | Wang | |
| 2017/0217421 | A1* | 8/2017 | Theodosis | B60W 10/20 |
| 2017/0248957 | A1* | 8/2017 | Delp | B60W 30/00 |
| 2017/0249839 | A1 | 8/2017 | Becker et al. | |

OTHER PUBLICATIONS

Hautiere, N. et al. (May 20-22, 2009). "Free Space Detection for Autonomous Navigation in Daytime Foggy Weather," MVA2009 IAPR Conference on Machine Vision Applications, pp. 501-504.
Notice of Allowance dated May 10, 2018, for U.S. Appl. No. 15/445,979, filed Feb. 28, 2017, eight pages.

* cited by examiner

SYSTEM AND METHOD FOR ASSISTING NAVIGATION OF VEHICLE THROUGH TRAFFIC

CROSS REFERENCE TO RELATED APPLICATION

This application claims the benefit of U.S. Provisional Patent Application No. 62/288,963, filed on Jan. 29, 2016, the entire disclosure of which is incorporated herein by reference in its entirety for all intended purposes.

FIELD OF THE DISCLOSURE

This relates generally to traffic indicators, and more particularly, to providing the driver of a vehicle with indications when the vehicle is free to enter a given region of a road.

BACKGROUND OF THE DISCLOSURE

Modern vehicles, especially automobiles, increasingly include various sensors for detecting and gathering information about the vehicles' surroundings. Currently, however, these sensors may provide limited information on which the driver of a vehicle can act (e.g., sensors may include ultrasonic sensors for only detecting the proximity of a vehicle to objects in the vehicle's surroundings). Therefore, it can be beneficial to add additional sensors to a vehicle, or develop additional uses for existing sensors, to provide additional useful information to a driver of a vehicle about the vehicle's surroundings.

SUMMARY OF THE DISCLOSURE

Examples of the disclosure are directed to using one or more image sensors, cameras, radar sensors, or other suitable sensors outfitted on a stopped vehicle to determine whether the vehicle should begin moving into a given region (e.g., a region a road)—if so, the vehicle can give the driver an audible, visual, tactile, etc., indication of such a determination. In some examples, the region can be an intersection with a traffic controller (e.g., a traffic light) at which the vehicle is stopped, and the vehicle can determine when the traffic controller indicates permission to proceed, and when the surrounding traffic begins moving, to alert the driver of the movement. In some examples, the region can be a left-hand turn area of a road, and the vehicle can determine when a sufficient amount of time exists for the vehicle to complete the left-hand turn, and alert the driver of that determination.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some vehicles, such as automobiles, may include sensors that provide limited information on which the drivers of the vehicles can act (e.g., sensors may include ultrasonic sensors for only detecting the proximity of a vehicle to objects in the vehicle's surroundings). It can be beneficial to add additional sensors to a vehicle, or develop additional uses for existing sensors, to provide additional useful information to a driver of a vehicle about the vehicle's surroundings. Examples of the disclosure are directed to using one or more sensors (e.g., camera or radar) on a stopped vehicle to determine whether the vehicle should begin moving into a given region (e.g., the road ahead)—if so, the vehicle can give the driver an audible, visual, tactile, etc., indication of that determination. In some examples, the region can be an intersection with a traffic light at which the vehicle is stopped, and the vehicle can determine when the traffic light turns green, and when the surrounding traffic begins moving, to alert the driver of the movement. In some examples, the region can be a left-hand turn area of the road, and the vehicle can determine when a sufficient amount of time exists for the vehicle to complete the left-hand turn, and alert the driver of that determination.

Figure 1A:
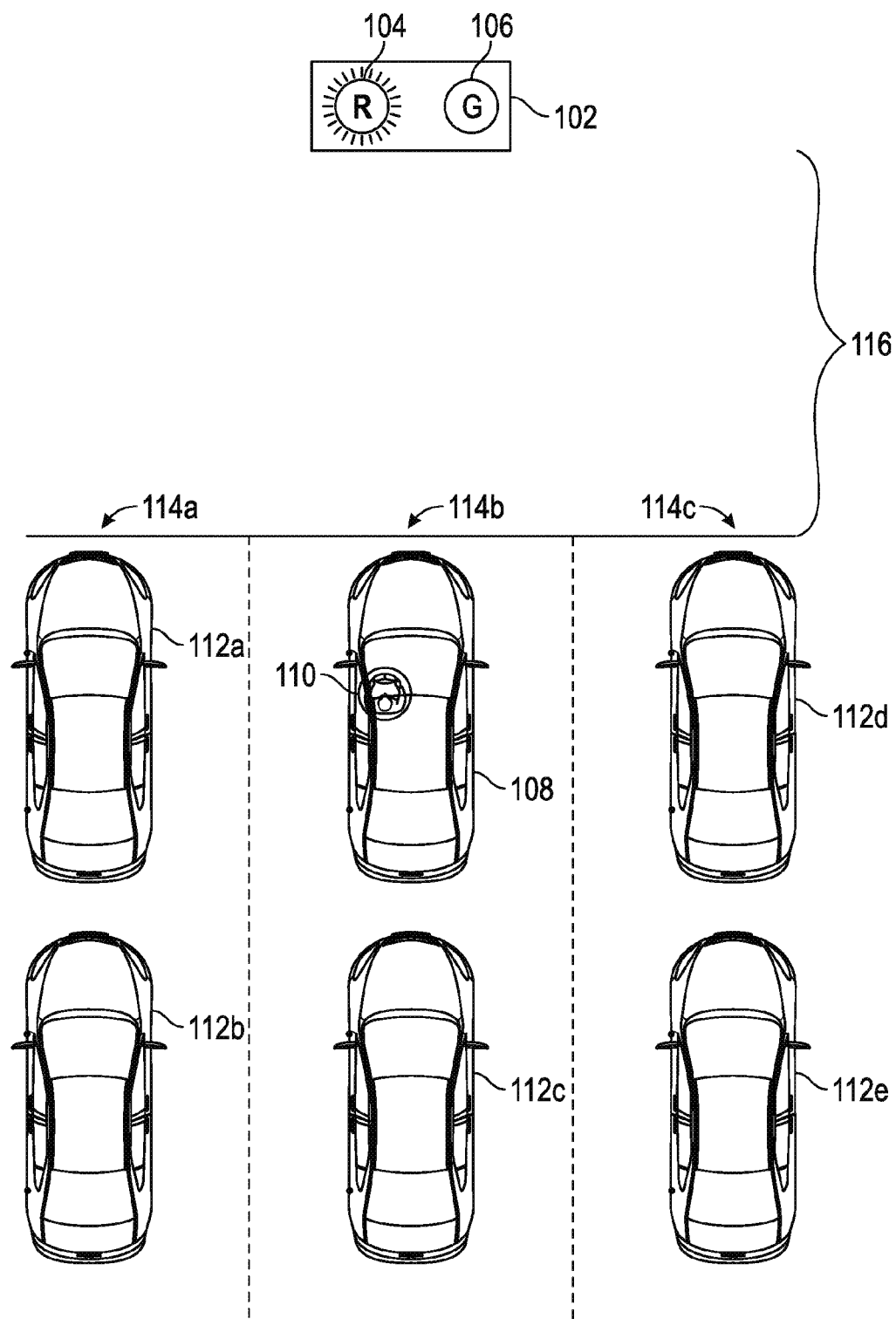
FIGS. 1A-1B illustrate an exemplary traffic flow scenario according to examples of the disclosure.
Figure 1B:
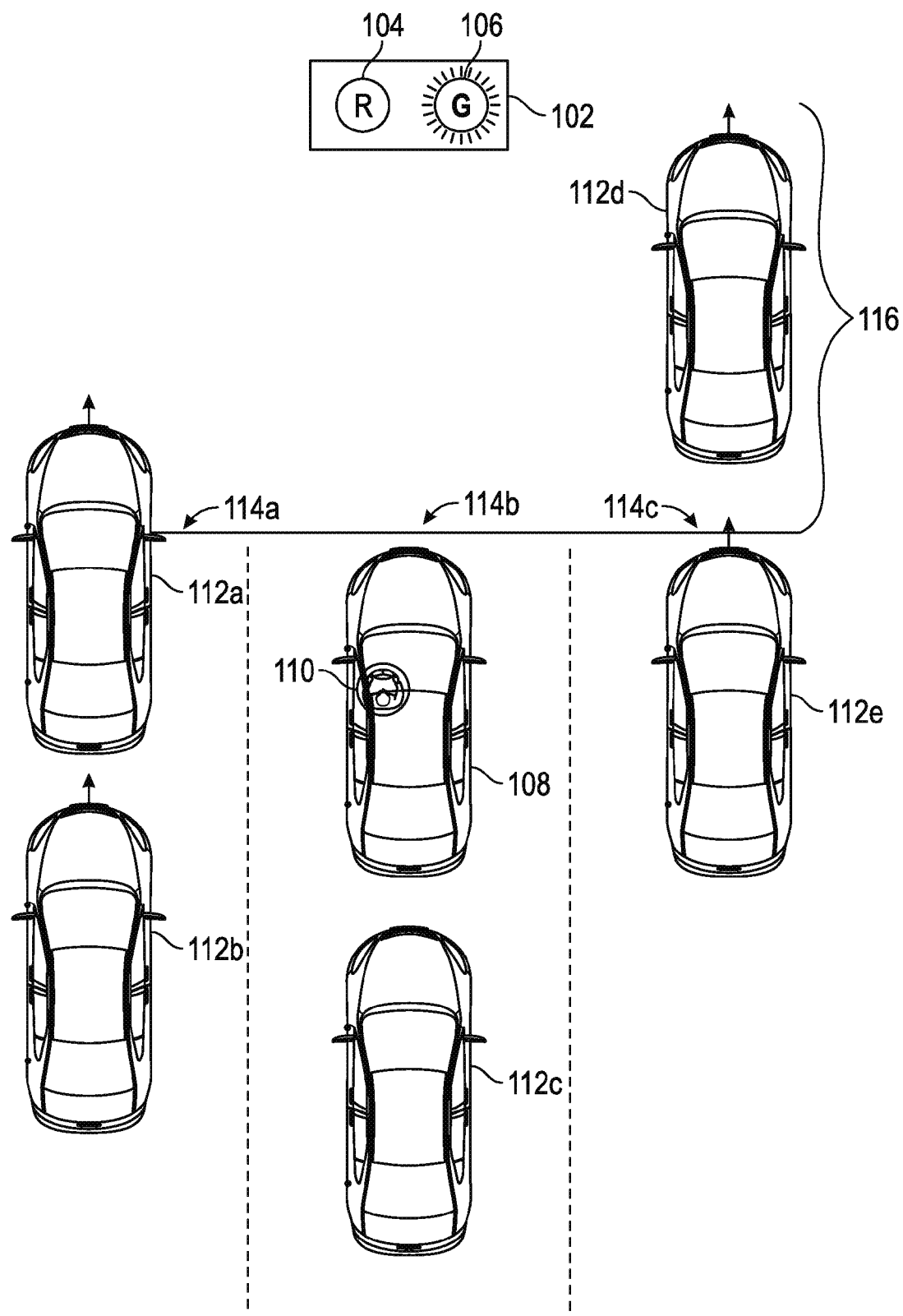

FIGS. 1A-1B illustrate an exemplary traffic flow scenario in which the preferred embodiment of the present invention may operate. FIG. 1A illustrates vehicles 108 and 112a-112e (referred to collectively as 112) stopped at traffic light 102 on a road including lanes 114a, 114b and 114c. Vehicles 108 and 112a-112e may be any types of vehicles, such as automobiles, buses, trucks, vans, motorcycles, bicycles, and so on. Vehicle 108 can accommodate driver 110 or include assisted or autonomous driving functions. Vehicles 112 can also accommodate drivers and/or autonomous driving functions, though they are not illustrated for ease of description. Traffic light 102 can include red light 104, which can currently be illuminated, and which can indicate that vehicles 108 and 112a-112e should not proceed into region 116 of the road, and green light 106, which can currently not be illuminated. Region 116 of the road can correspond to an intersection, for example, or any other region of a road to which traffic light 102 can control vehicle access.

Three lanes of the road can be illustrated in FIG. 1A: lane 114a, which can include vehicles 112a and 112b, lane 114b, which can include vehicles 108 and 112c, and lane 114c, which can include vehicles 112d and 112e. The road can include fewer or more lanes than those illustrated in accordance with the examples of the disclosure.

FIG. 1B illustrates traffic light 102 having changed from red (stop indicator) to green (proceed indicator) such that red light 104 is not currently illuminated, and green light 106 is currently illuminated, which can indicate that vehicles 108 and 112a-112e are free to enter region 116 of the road. In response, one or more of vehicles 112 can have started moving, and can have entered region 116 of the road to varying degrees. For example, vehicle 112a can have started moving and partially entered region 116 of the road, while vehicle 112b can have started moving but not yet entered region 116 of the road. Similarly, vehicle 112d can have started moving and fully entered region 116 of the road, while vehicle 112e can have started moving but not yet entered region 116 of the road.

Vehicle 108 may not have started moving yet in response to traffic light 102 having changed from red to green, thus preventing vehicle 112c from moving, as well. In some examples, driver 110 may have become distracted while waiting at traffic light 102 while it was red, and thus may not have noticed the traffic light changing from red to green. Due to the distraction of driver 110, and the corresponding lack of movement of vehicle 108 when traffic light 102 changed from red to green, traffic flow in lane 114b of the road can be impeded. Thus, it can be beneficial for vehicle 108 to selectively give driver 110 an indication (e.g., visual, auditory, tactile, and/or otherwise) that the driver should begin to move into region 116 of the road in circumstances such as those illustrated in FIGS. 1A-1B.

Figure 2A:
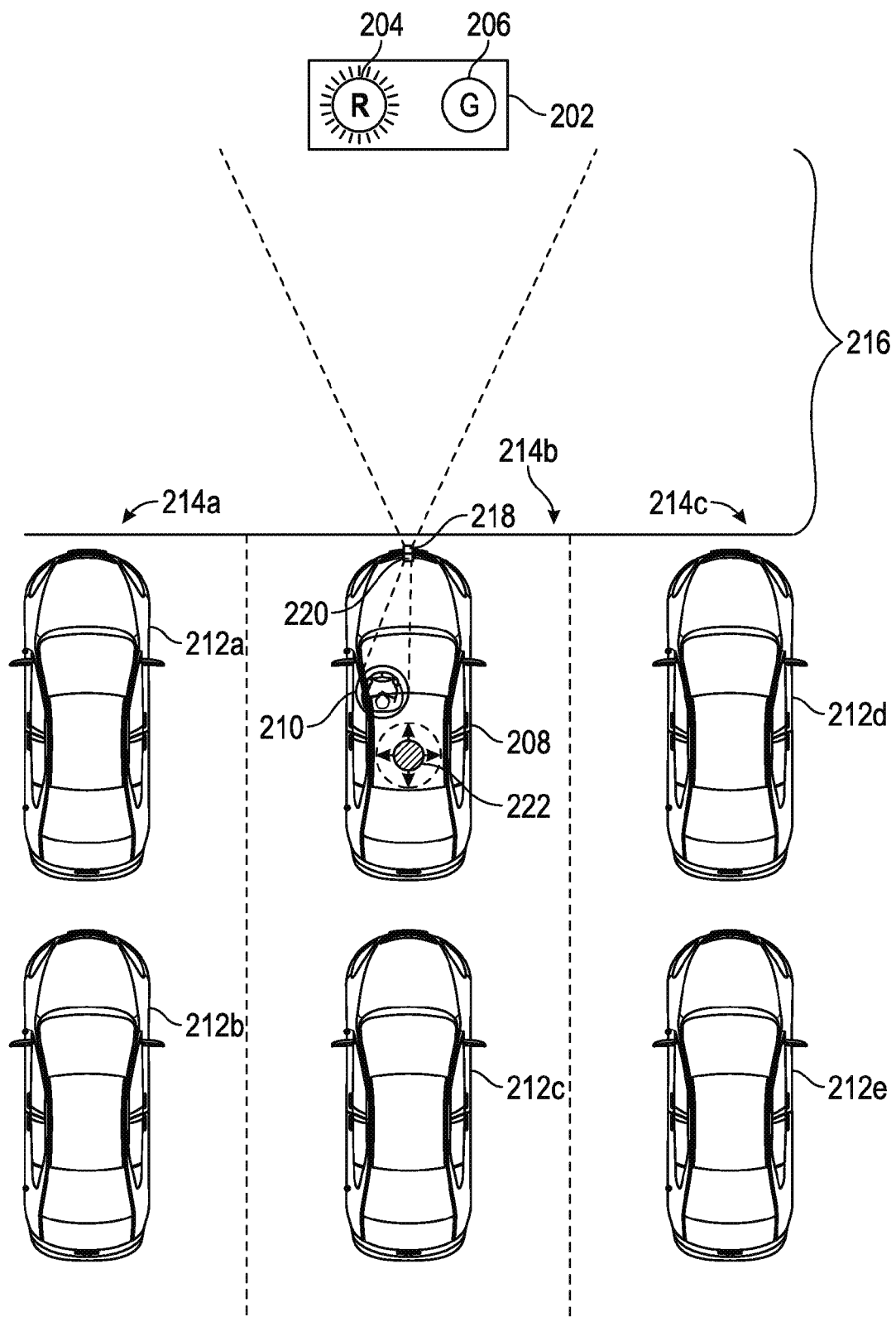
FIGS. 2A-2B illustrate an exemplary traffic flow scenario in which a vehicle can include various sensors and systems for providing a driver with an indication of traffic flow according to examples of the disclosure.
Figure 2B:
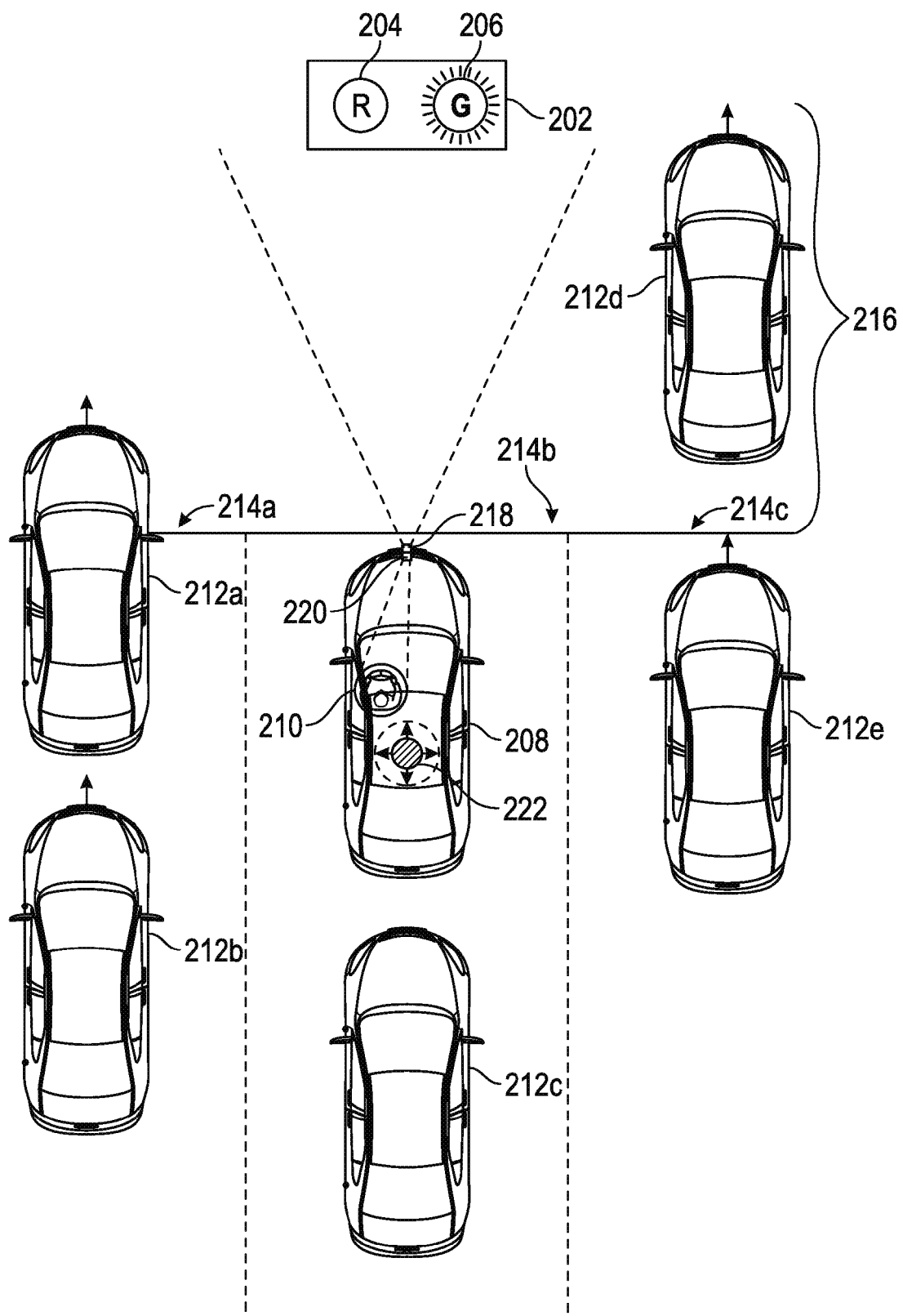

FIGS. 2A-2B illustrate an exemplary traffic flow scenario in which vehicle 208 can include various sensors and systems for providing driver 210 with an indication of traffic flow according to examples of the disclosure. The arrangement of vehicles 208 and 212, and the state of traffic light 202 can be the same as described with reference to FIG. 1A. However, vehicle 208 can include various sensors (e.g., optical cameras, ultrasonic sensors, radar sensors, laser sensors, LIDAR sensors, etc.) for detecting characteristics of the traffic flow surrounding vehicle 208 and/or the attentive state of driver 210.

Specifically, in some examples, vehicle 208 can include substantially forward-facing camera 218, the field of view of which can include traffic light 202. Vehicle 208 can also include substantially driver-facing camera 220, the field of view of which can include driver 210 (e.g., the driver's eyes, the driver's face, the driver's upper body, etc.). Cameras 218 and 220 can be any type of camera, such as visible light cameras, infrared cameras, ultraviolet cameras, etc. Additionally, vehicle 208 can include radar 222, which can have the ability to detect objects (including other vehicles) in substantially any direction of vehicle 208. Cameras 218 and 220, and radar 222 are provided by way of example only, and it is understood that other sensors can similarly be used to implement the examples of the disclosure, whether in conjunction with cameras 218 and 220, and radar 222, or in lieu of cameras 218 and 220, and radar 222 (e.g., ultrasonic sensors can be used to detect objects around vehicle 208).

Using camera 218, vehicle 208 can determine the state of traffic light 202 (e.g., whether red light 204 or green light 206 is illuminated) using any number of appropriate image processing techniques. Similarly, using camera 220, vehicle 208 can determine whether driver 210 is distracted using any number of appropriate image processing techniques. For example, vehicle 208, using camera 220, can track the eyes of driver 210 to determine whether the driver is looking ahead towards traffic light 202 (e.g., indicating that the driver is not distracted), or whether the driver is looking down, towards the back seat, or otherwise not looking at surrounding traffic conditions (e.g., indicating that the driver is distracted). In addition to making the above determinations about the state of traffic light 202 and driver 210, vehicle 208, using radar 222, can determine the position(s) and/or movement(s) of vehicles 212 surrounding vehicle 208.

FIG. 2B shows traffic light 202 having changed from red to green. The arrangement of vehicles 208 and 212, and the state of traffic light 202 can be the same as described with reference to FIG. 1B. Vehicle 208 can determine that green light 206 is illuminated, using camera 218. Additionally, vehicle 208 can determine that vehicles 212a, 212b, 212d and 212e have started moving, using radar 222, and can determine that vehicle 208 has not started moving (e.g., using sensors and/or systems the vehicle uses to determine its speed). In light of this determination, vehicle 208 can provide an indication (e.g., auditory, visual, tactile, etc.) to driver 210 if vehicle 208 determines that the driver is distracted. For example, if vehicle 208 determines that driver 210 is distracted, the vehicle may play a sound through one or more speakers in the vehicle, cause one or more lights inside the vehicle to flash, display a visual indication on one or more display screens (e.g., liquid crystal displays, organic light emitting diode displays, etc.) inside the vehicle and/or provide vibration to the steering wheel of the vehicle or the driver's seat of the vehicle. If vehicle 208 determines that driver 210 is not distracted, the vehicle can forgo providing an indication to the driver, as the lack of movement of vehicle 208 can be determined to be a conscious decision by the driver. In some examples, vehicle 208 can provide an indication to driver 210 whether or not the vehicle determines that the driver is distracted. In this way, vehicle 208 can assist driver 210 in avoiding distraction in various traffic flow scenarios.

Figure 3:
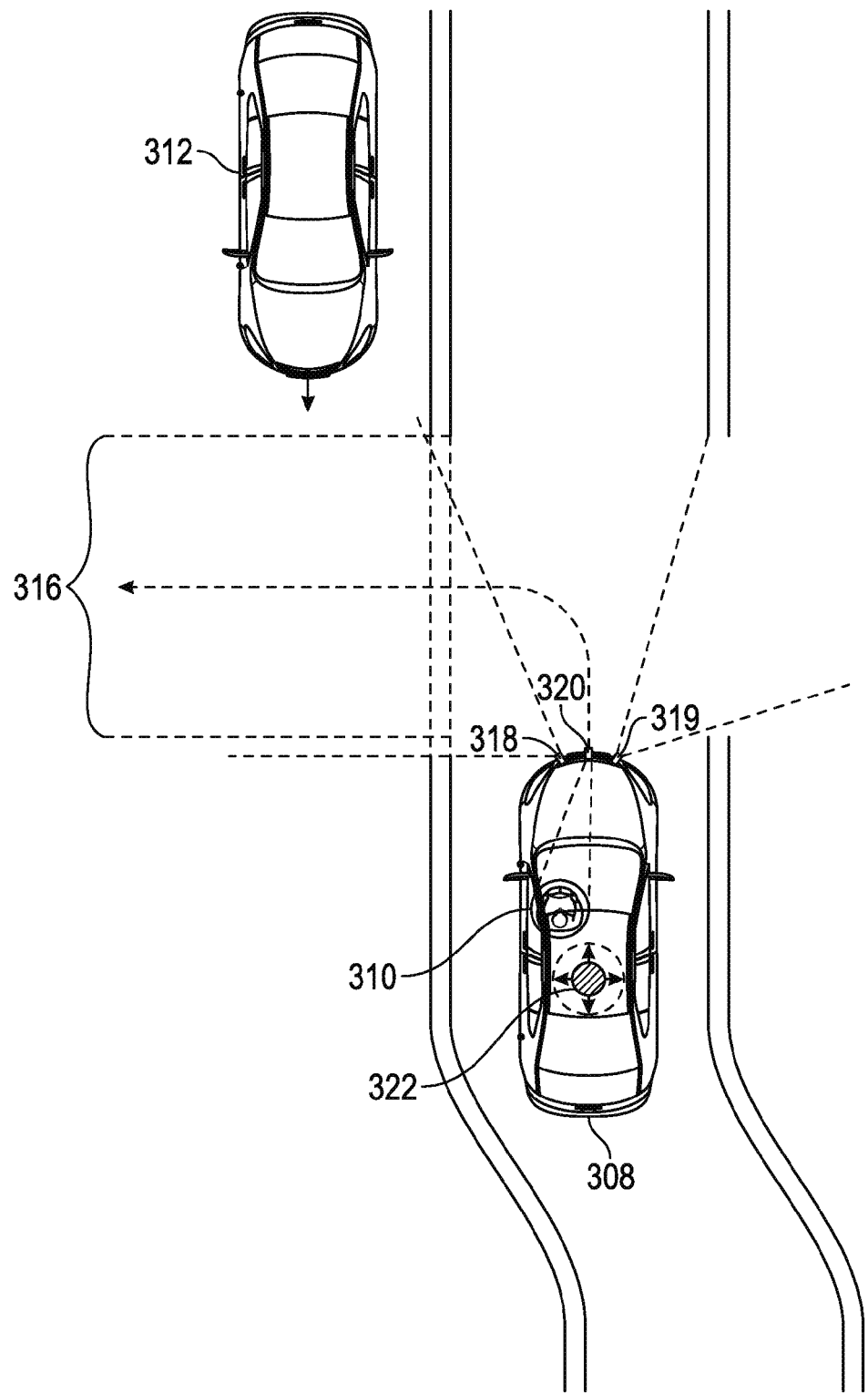
FIG. 3 illustrates an exemplary traffic scenario in which one or more sensors on a vehicle can be used to determine whether the vehicle can proceed into a given region of a road according to examples of the disclosure.

FIG. 3 illustrates an exemplary traffic scenario in which one or more sensors on vehicle 308 can be used to determine whether the vehicle can proceed into region 316 of a road according to examples of the disclosure. Vehicle 308 can include driver 310. Similar to as described with reference to FIGS. 2A-2B, vehicle 308 can include radar 322, and cameras 318, 319 and/or 320, though different sensor configurations can similarly be used. Vehicle 308 can be stopped in a left-turn lane in the road, preparing to turn left into region 316 of the road, for example. While the examples of the disclosure are described in the context of a vehicle making a left-hand turn from a left-turn lane, it is understood that the examples of the disclosure can be implemented in any traffic scenario in which a vehicle is stopped ahead of entering a given region of a road (e.g., stopped while waiting to turn right, stopped while waiting to proceed forward, etc.). Region 316 of the road can be at least partially within the field of view of camera 318 and/or within the field of sensitivity of radar 322.

While stopped, vehicle 308 can determine whether region 316 of the road is clear of obstacles (e.g., other vehicles, objects, etc.) using camera 318 and/or radar 322. Region 316 of the road can be a region of the road that vehicle 308 determines it will move into and through if the driver proceeds with making a left-hand turn. This determination can be based on the position of region 316 relative to vehicle 308 (e.g., ahead and to the left of the vehicle by predetermined distances), lines on the road, or other considerations. Vehicle 308 can determine to examine region 316—as opposed to a region in front of, or to the right of, the vehicle—in accordance with a determination that the vehicle is stopped and a left turn signal on the vehicle is activated. For example, if vehicle 308 is stopped and a right turn signal is activated, the vehicle can instead determine whether a region to the right of the vehicle is clear of obstacles (e.g., other vehicles, objects, etc.) using camera 318 and/or radar 322.

Vehicle 308 can also determine the existence and speed of vehicle(s) approaching region 316 using camera 318 and/or radar 322—for example, vehicle 312 approaching region 316. In some examples, by its nature, radar 322 can be better suited than camera 318 for determining the speed of vehicle 312, though camera 318 could be used instead or in conjunction with radar 322. Based on the existence and speed of vehicle 312, vehicle 308 can determine how long it will take for vehicle 312 (and any other vehicle that might be moving towards region 316) to reach region 316 using any number of appropriate motion extrapolation techniques. Vehicle 308 can determine whether sufficient time exists for vehicle 308 to complete the left-hand turn into and through region 316 before vehicle 312 (or any other vehicle that might be moving towards region 316) will reach region 316. This determination can be based on the estimated arrival time of vehicle 312 to region 316, as well as the estimated time required for vehicle 308 to turn into and exit region 316 (e.g., a predetermined amount of time, such as 3, 5 or 10 seconds). If the estimated time until arrival of vehicle 312 to region 316 is greater than the estimated time required for vehicle 308 to turn into and exit region 316 (in some examples, greater by a threshold time, such as 5, 10 or 15 seconds), then vehicle 308 can provide an indication to driver 310 that a window of time exists for making the left-hand turn. The indication can be any kind of indication; for example, the vehicle may play a sound through one or more speakers in the vehicles, cause one or more lights inside the vehicle to flash, display a visual indication on one or more display screens (e.g., liquid crystal displays, organic light emitting diode displays, etc.) inside the vehicle and/or provide vibration to the steering wheel of the vehicle or the driver's seat of the vehicle. In some examples, similar to as described with reference to FIGS. 2A-2B, vehicle 308 may only provide an indication to the driver if the vehicle determines that the driver is distracted.

Figure 4:
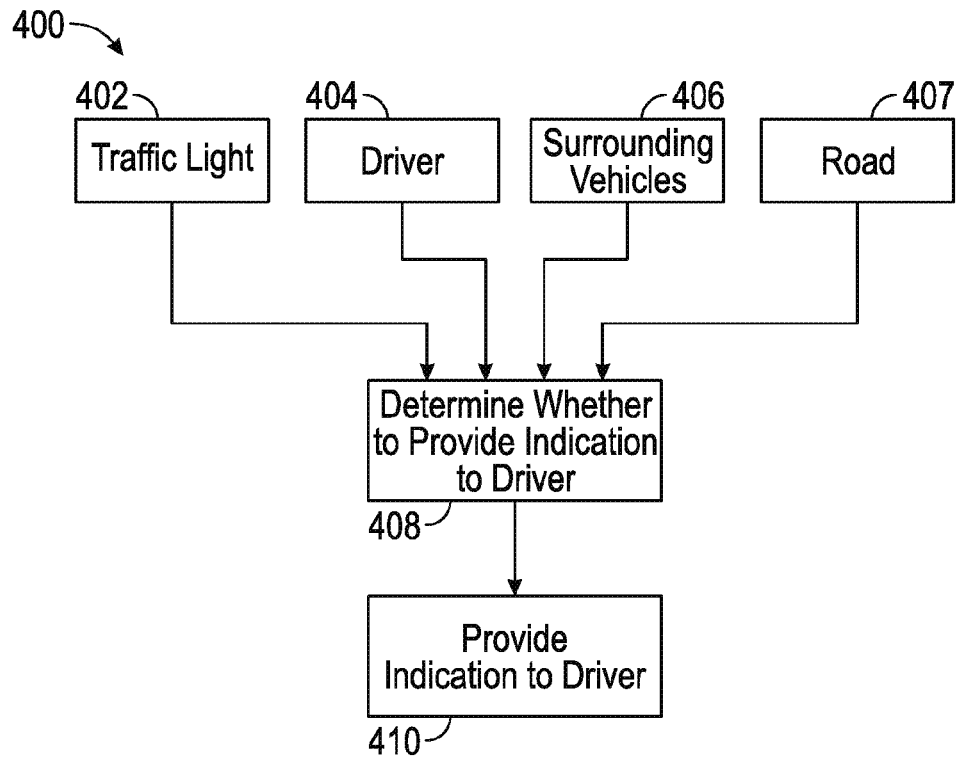
FIG. 4 illustrates an exemplary process for providing an indication, to a driver of a vehicle, of a state of traffic flow surrounding the vehicle according to examples of the disclosure.

FIG. 4 illustrates an exemplary process 400 for providing an indication, to a driver of a vehicle or an autonomous driving system, of a state of traffic flow surrounding the vehicle according to examples of the disclosure. Process 400 can be performed when the vehicle determines that it is stopped at a traffic light, for example. In some examples, process 400 can analogously be performed at other times when the vehicle is stopped, for example, when the vehicle is stopped in traffic, or when the vehicle is stopped at a stop sign. In such examples, the steps of process 400 can be altered to account for the different circumstances of the vehicle.

At 402, the state of the traffic light can be monitored (e.g., as described with reference to FIGS. 2A-2B). In some examples, whether the traffic light is red or green can be determined at 402. It is understood that red and green lights as indicating the state of the traffic light are provided by way of example only, and that other indications of the state of the traffic light can similarly be monitored by the vehicle. In examples in which the vehicle cannot determine the state of the traffic light (e.g., if the traffic light is not within the field of view of the vehicle's camera, if the vehicle is not a lead vehicle at the traffic light, if the vehicle is stopped in traffic or at a stop sign, and not at a traffic light, etc.), step 402 can be skipped in process 400. Instead, the vehicle can monitor characteristics of movement of surrounding vehicles in making its determination as to whether to provide an indication to the driver. Exemplary techniques for detecting and mapping traffic lights are described in Fairfield, N., & Urmson, C. (2011, May), "Traffic light mapping and detection, " In Robotics and Automation (ICRA), 2011 IEEE International Conference on (pp. 5421-5426), the contents of which is hereby incorporated by reference for all purposes.

At 404, the attentive state of the driver of the vehicle can be monitored (e.g., as described with reference to FIGS. 2A-2B). For example, whether or not the driver is distracted can be determined using a camera pointed at the driver, as previously described.

At 406, the state of surrounding vehicles can monitored (e.g., as described with reference to FIGS. 2A-2B). For example, whether or not surrounding vehicles have started moving, and the extent to which they have done so, can be determined. Step 406 can include monitoring the state of vehicles in front of the vehicle, including when step 402 cannot be performed, as described above.

At 407, the state of the portion of the road into which the vehicle will move if the vehicle starts to move (e.g., the intersection) can be monitored (e.g., as described with reference to FIGS. 2A-2B). For example, whether or not the intersection (in some examples, only the portion of the intersection in front of the vehicle) is clear of vehicles, objects or other obstacles can be determined. Additionally, the state of the road can include rules of traffic in the region of the road, for example, whether the portion of the road is part of a one-way or two-way street. This additional information can be pre-stored in the memory of the vehicle and/or dynamically obtained from, for example, a GPS service using a GPS receiver.

At 408, whether to provide an indication to the driver to start moving can be determined based on the results of one or more of steps 402, 404, 406 and 407 (e.g., as described with reference to FIGS. 2A-2B). For example, if the traffic light is determined to be green at 402, surrounding vehicles are determined to have started moving at 406, the intersection ahead of the vehicle is determined to be free of obstacles at 407, and the driver is determined to be distracted at 404, the vehicle can determine to provide an indication to the driver to start moving. In some examples, the determination can be based on fewer than all of the factors listed above. For example, the vehicle can determine to provide an indication to the driver whether or not the driver is distracted, if the traffic light is determined to be green and surrounding vehicles are determined to have started moving. As another example, traffic light information may not be available from step 402; in such circumstances, the vehicle can monitor surrounding vehicle movement and driver state, and can provide an indication to the driver if the surrounding vehicles are determined to have started moving and the driver is determined to be distracted. In some examples, driver state can be controlling during the determination at 408, such that an indication will not be provided to the driver unless the driver is determined to be distracted at 404.

At 410, if it is determined that an indication should be provided to the driver at 408, the indication can be provided (e.g., as described with reference to FIGS. 2A-2B). For example, the vehicle may play a sound through one or more speakers in the vehicle, cause one or more lights inside the vehicle to flash, display a visual indication on one or more display screens (e.g., liquid crystal displays, organic light emitting diode displays, etc.) inside the vehicle and/or provide vibration to the steering wheel of the vehicle or the driver's seat of the vehicle. Additionally or alternatively, if the vehicle determines that it can drive into and/or through the portion of the road safely (e.g., based on a determination that the light is green and the road ahead of the vehicle is clear of obstacles), and if the vehicle is set in an autonomous driving mode, the vehicle can, for example, automatically disengage the brakes, engage its drive system, and adjust its steering angle to move at a calculated speed and direction into and/or through the portion of the road.

Figure 5:
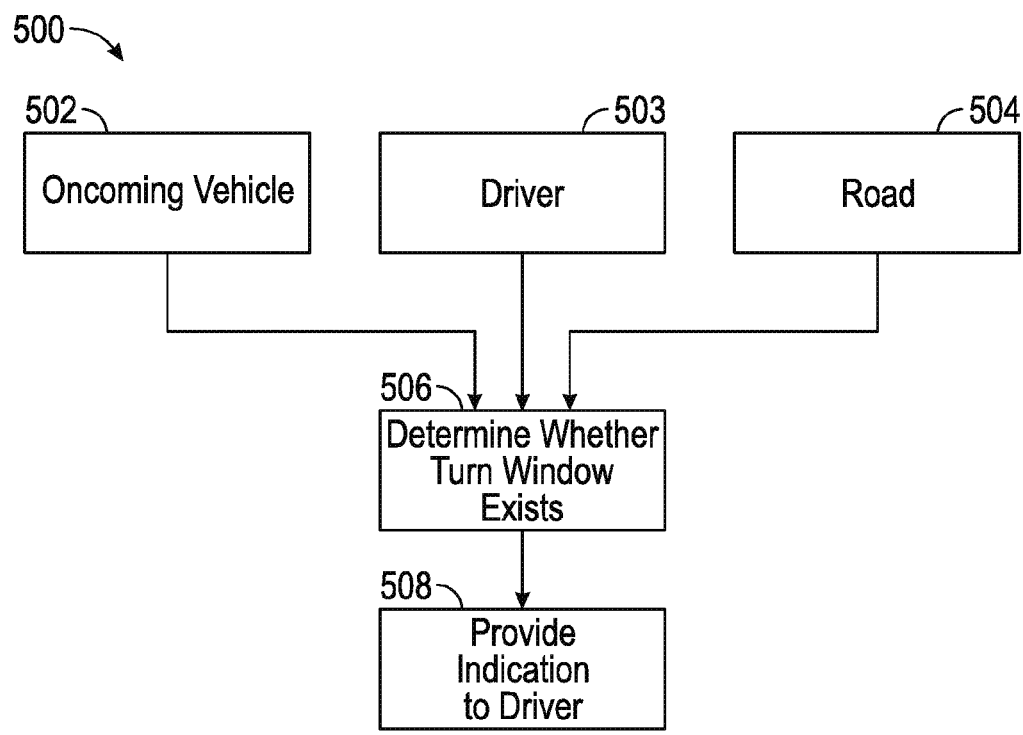
FIG. 5 illustrates an exemplary process for providing an indication, to a driver of a vehicle, that a window of time exists for proceeding into a region of a road according to examples of the disclosure.

FIG. 5 illustrates an exemplary process 500 for providing an indication, to a driver of a vehicle, that a window of time exists for proceeding into a region of a road according to examples of the disclosure. Process 500 can be performed when it is determined that the vehicle is stopped in a left-turn lane (or, analogously, a right-turn lane), for example. In some examples, process 500 may only be performed when it is determined that the vehicle is stopped in a left-turn lane, and the vehicle's left turn signal is activated (or, analogously, a right-turn lane and the vehicle's right turn signal is activated). In some examples, process 500 can analogously be performed other times when the vehicle is stopped ahead of entering any region of a road; for example, when the vehicle is stopped in front of an intersection with cross-traffic coming from the right and/or left. In such examples, the steps of process 500 can be altered to account for the different circumstances of the vehicle.

At 502, it can be determined whether there are any vehicles approaching the region into which the vehicle is set to enter (e.g., as described with reference to FIG. 3). For example, it can be determined whether a vehicle is moving towards the region of the road into which the vehicle will enter when the vehicle turns left. If such a vehicle is identified, its position, speed and/or trajectory can also be determined at 502.

At 503, the attentive state of the driver of the vehicle can be monitored (e.g., as described with reference to FIG. 3). For example, whether or not the driver is distracted can be determined using a camera pointed at the driver, as previously described.

At 504, the state of the portion of the road into which the vehicle will move if the vehicle starts to move (e.g., the intersection, the left turn portion of the road, etc.) can be monitored (e.g., as described with reference to FIG. 3). For example, whether or not the left-hand turn region of the road is currently clear of vehicles, objects or other obstacles can be determined. Additionally, the state of the road can include rules of traffic in the region of the road, for example, whether the portion of the road is a one-way or two-way street, and/or whether a left turn or U-turn is prohibited during certain time(s) of the day. This additional information can be pre-stored in the memory of the vehicle and/or dynamically obtained from, for example, a GPS service using a GPS receiver.

At 506, whether a window of time exists for the vehicle to proceed into the region of the road can be determined (e.g., as described with reference to FIG. 3). This determination can be based on the existence and/or speed of any oncoming vehicles, as determined at 502, and whether the region of the road is clear of obstacles, as determined at 504. For example, the vehicle can determine an estimated length of time for the vehicle to turn into and drive through the left-hand turn region of the road. This estimate can be based on the size of the region, an estimated speed of the vehicle when turning, and any other factors that might be relevant to the estimate—in some examples, this estimated length of time can be a predetermined amount of time, such as 3, 5 or 10 seconds. Additionally, the vehicle can determine an estimated amount of time until any oncoming vehicles will reach the left-hand turn region based on their determined speeds and positions. If the shortest estimated time for an oncoming vehicle to reach the region is greater than (some-times greater by a threshold amount than, such as 5, 10 or 15 seconds) the estimated time for the vehicle to complete the left-hand turn, then the vehicle can determine that a sufficient window of time exists for the vehicle to complete the left-hand turn. Alternatively, if no oncoming vehicles exist, the system can similarly determine that a sufficient window of time exists for the vehicle to complete the left-hand turn.

At 508, if it is determined at 506 that a sufficient window of time exists for the vehicle to enter and drive through the region of the road, an indication can be provided to the driver (e.g., as described with reference to FIG. 3). In some examples, the indication may only be provided to the driver if the vehicle determines that the driver is distracted at 503. Additionally or alternatively, if the vehicle determines that there is enough time to drive through the region of the road safely (e.g., based on the determinations that sufficient time to turn exists, and that the region of the road is clear of obstacles), and if the vehicle is set in an autonomous driving mode, the vehicle can, for example, automatically disengage the brakes, engage its drive system, and adjust its steering angle to move at a calculated speed and direction into and through the region of the road.

Figure 6:
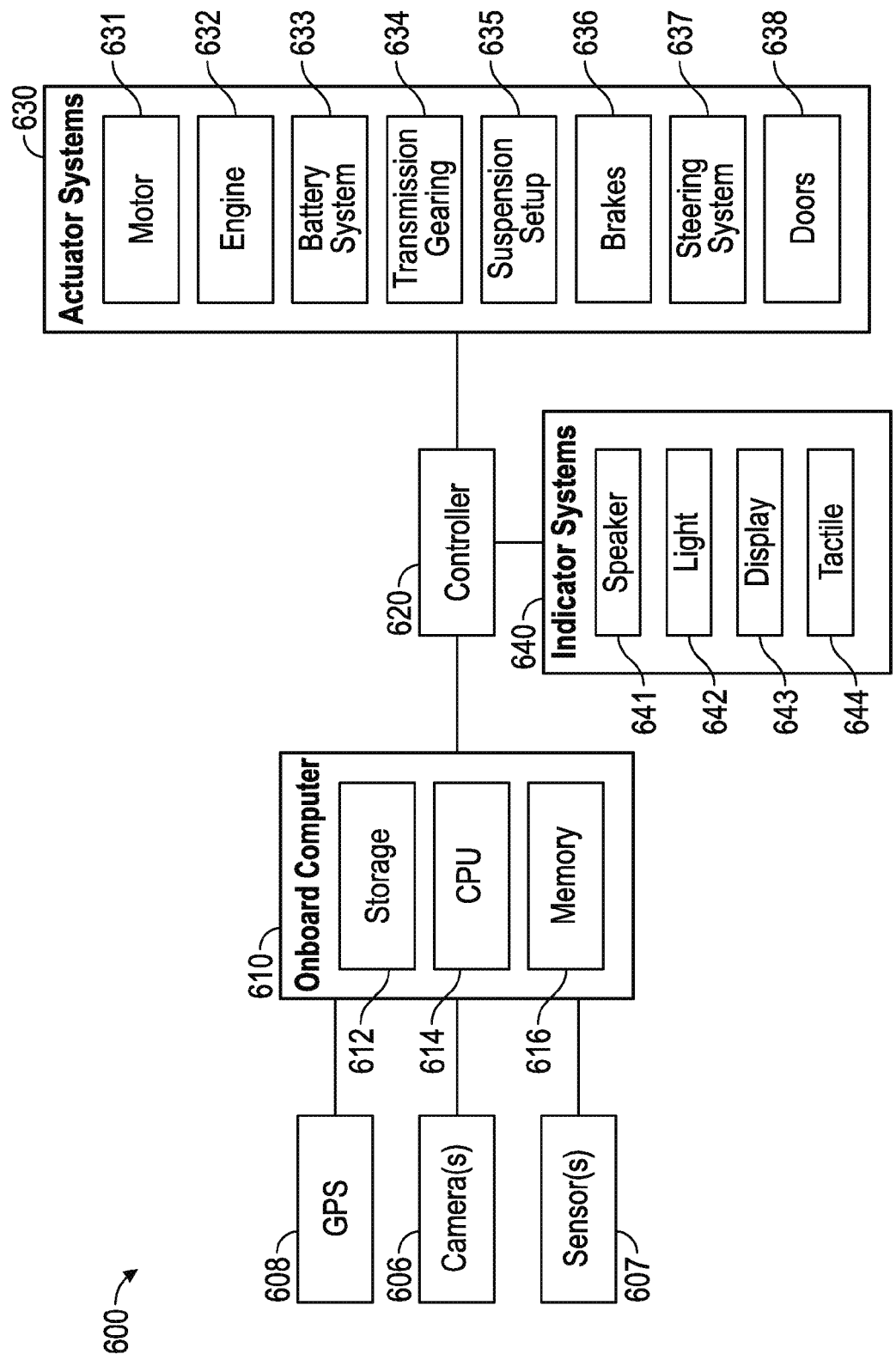
FIG. 6 illustrates a system block diagram of a vehicle control system according to examples of the disclosure.

FIG. 6 illustrates a system block diagram of vehicle control system 600 according to examples of the disclosure. Vehicle control system 600 can perform any of the methods described with reference to FIGS. 2A-2B and 3-5. System 600 can be incorporated into a vehicle, such as a consumer automobile. Other example vehicles that may incorporate the system 600 include, without limitation, airplanes, boats, or industrial automobiles. Vehicle control system 600 can include one or more cameras 606 capable of capturing image data (e.g., video data), as previously described with respect to FIGS. 2A-2B and 3-5. Vehicle control system 600 can also include one or more other sensors 607 (e.g., radar, ultrasonic, etc.) capable of detecting objects in the vehicle's surroundings. Vehicle control system 600 can include an on-board computer 610 coupled to the cameras 606 and sensors 607, and capable of receiving the image data from the camera and/or outputs from the sensors 607. The on-board computer 610 can be capable of determining whether to provide, to a driver, an indication of a state of traffic flow around the vehicle, and whether to provide, to the driver, an indication of the existence of a window of time for proceeding into a region of a road, as described in this disclosure. On-board computer 610 can include storage 612, memory 616, and a processor 614. Processor 614 can perform any of the methods described with reference to FIGS. 2A-2B and 3-5. Additionally, storage 612 and/or memory 616 can store data and instructions for performing any of the methods described with reference to FIGS. 2A-2B and 3-5. Storage 612 and/or memory 616 can be any non-transitory computer readable storage medium, such as a solid-state drive or a hard disk drive, among other possibilities. The vehicle control system 600 can also include a controller 620 capable of controlling one or more aspects of vehicle operation, such as providing an indication to a driver based on the determinations of the on-board computer 610.

In some examples, the vehicle control system 600 can be connected to (e.g., via controller 620) one or more actuator systems 630 in the vehicle and one or more indicator systems 640 in the vehicle. The one or more actuator systems 630 can include, but are not limited to, a motor 631 or engine 632, battery system 633, transmission gearing 634, suspension setup 635, brakes 636, steering system 637 and door system 638. The vehicle control system 600 can control, via controller 620, one or more of these actuator systems 630 during vehicle operation. The one or more indicator systems 640 can include, but are not limited to, one or more speakers 641 in the vehicle (e.g., as part of an entertainment system in the vehicle), one or more lights 642 in the vehicle, one or more displays 643 in the vehicle (e.g., as part of a control or entertainment system in the vehicle) and one or more tactile actuators 644 in the vehicle (e.g., as part of a steering wheel or seat in the vehicle). The vehicle control system 600 can control, via controller 620, one or more of these indicator systems 640 to provide indications to the driver of a state of traffic flow around the vehicle, and/or the existence of a window of time for proceeding into a region of a road. This can be done as described with reference to FIGS. 2A-2B and 3-5, for example.

Thus, the examples of the disclosure describe various ways to provide indications to a driver of a vehicle of a state of traffic flow around the vehicle or the existence of a window of time for the vehicle to move into and through a region of a road.

Therefore, according to the above, some examples of the disclosure are directed to a system comprising: one or more processors; and a memory including instructions, which when executed by the one or more processors, cause the one or more processors to perform a method comprising: while a first vehicle is stopped: receiving first data from a first set of sensors mounted on the first vehicle, the first data indicative of a state of traffic surrounding the first vehicle; receiving second data from a second set of sensors mounted on the first vehicle, the second data indicative of a state of attention of a driver of the first vehicle; determining whether the first data and the second data satisfy indication-generation criteria, including a criterion that is satisfied when the second data indicates that the driver is distracted; and in response to the determination: in accordance with a determination that the first data and the second data satisfy the indication-generation criteria, providing the driver of the first vehicle with an indication to proceed into a region of a road; and in accordance with a determination that the first data and the second data do not satisfy the indication-generation criteria, forgoing providing the driver of the first vehicle with the indication. Additionally or alternatively to one or more of the examples disclosed above, in some examples, the first set of sensors comprises a radar sensor, and the first data comprises radar information about movement of vehicles surrounding the first vehicle. Additionally or alternatively to one or more of the examples disclosed above, in some examples, the first set of sensors comprises a camera, and the first data comprises image information about a state of a traffic light in front of the first vehicle. Additionally or alternatively to one or more of the examples disclosed above, in some examples, the second set of sensors comprises a camera, and the second data comprises image information of the driver of the first vehicle. Additionally or alternatively to one or more of the examples disclosed above, in some examples, the indication-generation criteria include a criterion that is satisfied when the first data indicates that a traffic light in front of the first vehicle indicates that the first vehicle can enter the region in the road. Additionally or alternatively to one or more of the examples disclosed above, in some examples, the indication-generation criteria include a criterion that is satisfied when the first data indicates that vehicles surrounding the first vehicle have started moving into the region in the road. Additionally or alternatively to one or more of the examples disclosed above, in some examples, the indication-generation criteria include a criterion that is satisfied when the first data indicates that the region in the road is clear of objects. Additionally or alternatively to one or more of the examples disclosed above, in some examples, the indication-generation criteria include a criterion that is satisfied when a signal on the first vehicle for entering the region in the road is activated, and the first data indicates that the region in the road is clear of objects. Additionally or alternatively to one or more of the examples disclosed above, in some examples, the indication-generation criteria include a criterion that is satisfied when the first data indicates that the region in the road will be clear of objects for greater than a predetermined time period. Additionally or alternatively to one or more of the examples disclosed above, in some examples, the method further comprises receiving third data indicative of a state of the region of the road, independent of a state of traffic in the region of the road, and the indication-generation criteria include a criterion that is satisfied when the state of the region of the road corresponds to a state that allows for the first vehicle to proceed into the region of the road. Additionally or alternatively to one or more of the examples disclosed above, in some examples, the state of the region of the road is indicative of a rule of traffic in the region of the road. Additionally or alternatively to one or more of the examples disclosed above, in some examples, the state of the region of the road is predetermined and received from a memory in the first vehicle. Additionally or alternatively to one or more of the examples disclosed above, in some examples, the state of the region of the road is received from a GPS receiver in the first vehicle.

Some examples of the disclosure are directed to a non-transitory computer-readable medium including instructions, which when executed by one or more processors, cause the one or more processors to perform a method comprising: while a first vehicle is stopped: receiving first data from a first set of sensors mounted on the first vehicle, the first data indicative of a state of traffic surrounding the first vehicle; receiving second data from a second set of sensors mounted on the first vehicle, the second data indicative of a state of attention of a driver of the first vehicle; determining whether the first data and the second data satisfy indication-generation criteria, including a criterion that is satisfied when the second data indicates that the driver is distracted; and in response to the determination: in accordance with a determination that the first data and the second data satisfy the indication-generation criteria, providing the driver of the first vehicle with an indication to proceed into a region of a road; and in accordance with a determination that the first data and the second data do not satisfy the indication-generation criteria, forgoing providing the driver of the first vehicle with the indication.

Some examples of the disclosure are directed to a first vehicle comprising: a first set of sensors; a second set of sensors; an indicator system; one or more processors coupled to the first set of sensors, the second set of sensors and the indicator system; and a memory including instructions, which when executed by the one or more processors, cause the one or more processors to perform a method comprising: while the first vehicle is stopped: receiving first data from the first set of sensors, the first data indicative of a state of traffic surrounding the first vehicle; receiving second data from the second set of sensors, the second data indicative of a state of attention of a driver of the first vehicle; determining whether the first data and the second data satisfy indication-generation criteria, including a criterion that is satisfied when the second data indicates that the driver is distracted; and in response to the determination: in accordance with a determination that the first data and the second data satisfy the indication-generation criteria, providing, via the indicator system, the driver of the first vehicle with an indication to proceed into a region of a road; and in accordance with a determination that the first data and the second data do not satisfy the indication-generation criteria, forgoing providing the driver of the first vehicle with the indication. Additionally or alternatively to one or more of the examples disclosed above, in some examples, the method further comprises: in accordance with the determination that the first data and the second data satisfy the indication-generation criteria, automatically moving the first vehicle into the region of the road. Additionally or alternatively to one or more of the examples disclosed above, in some examples, automatically proceeding into the region of the road comprises automatically disengaging brakes of the first vehicle, automatically engaging a drive system of the first vehicle, and automatically adjusting a steering angle of the first vehicle to automatically move the first vehicle at a calculated speed and direction into the region of the road.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A vehicular navigation assistance system of a vehicle comprising:
a first set of sensors;
a second set of sensors
one or more processors; and
a memory including instructions, which when executed by the one or more processors, cause the one or more processors to perform a method comprising the steps of:
receiving first data from the first set of sensors mounted on the vehicle, the first data indicative of a state of traffic surrounding the vehicle;
receiving second data from the second set of sensors mounted on the vehicle, the second data indicative of a state of attention of a driver of the vehicle, wherein the second set of sensors include at least one camera mounted and the second set of data include image data of the driver;
determining whether the first data and the second data satisfy indication-generation criteria, including a criterion that is satisfied when the second data indicates that the driver is distracted, wherein the driver is determined to be distracted if the image data of the driver indicates that the driver is not visually engaged with the surrounding traffic conditions; and
in response to a determination that the first data and the second data satisfy the indication-generation criteria, providing the driver of the vehicle with an indication to proceed into a region of a road.

2. The system of claim 1, wherein:
the first set of sensors comprises a radar sensor, and
the first data comprises radar information about movement of other vehicles surrounding the vehicle.

3. The system of claim 1, wherein:
the first set of sensors comprises a camera, and
the first data comprises image information about a state of a traffic indicator in front of the vehicle.

4. The system of claim 1, wherein the indication-generation criteria include a criterion that is satisfied when the first data indicates that a traffic indicator in front of the vehicle changes indication.

5. The system of claim 1, wherein the indication-generation criteria include a criterion that is satisfied when the first data indicates that other vehicles surrounding the vehicle have started moving into the region in the road.

6. The system of claim 1, wherein the indication-generation criteria include a criterion that is satisfied when the first data indicates that the region in the road is clear of objects.

7. The system of claim 1, wherein the indication-generation criteria include a criterion that is satisfied when a signal on the first vehicle for entering the region in the road is activated, and the first data indicates that the region in the road is clear of objects.

8. The system of claim 7, wherein the indication-generation criteria include a criterion that is satisfied when the first data indicates that the region in the road will be clear of objects for greater than a predetermined time period.

9. The system of claim 1, wherein the method further comprises receiving third data indicative of a state of the region of the road, independent of a state of traffic in the region of the road, and the indication-generation criteria include a criterion that is satisfied when the state of the region of the road corresponds to a state that allows for the vehicle to proceed into the region of the road.

10. The system of claim 9, wherein the state of the region of the road is indicative of a rule of traffic in the region of the road.

11. The system of claim 9, wherein the state of the region of the road is predetermined and received from a memory in the vehicle.

12. The system of claim 9, wherein the state of the region of the road is received from a GPS receiver in the vehicle.

13. A non-transitory computer-readable medium including instructions, which when executed by one or more processors of a vehicle, cause the one or more processors to perform a method of vehicular navigation comprising the steps of:
receiving first data from a first set of sensors mounted on the vehicle, the first data indicative of a state of traffic surrounding the vehicle;
receiving second data from a second set of sensors mounted on the vehicle, the second data indicative of a state of attention of a driver of the vehicle, wherein the second set of data include image data of the driver;
determining whether the first data and the second data satisfy indication-generation criteria, including a criterion that is satisfied when the second data indicates that the driver is distracted, wherein the driver is determined to be distracted if the image data of the driver indicates that the driver is not visually engaged with the surrounding traffic conditions; and
in response to a determination that the first data and the second data satisfy the indication-generation criteria, providing the driver of the first vehicle with an indication to proceed into a region of a road.

14. A vehicle comprising:
a first set of sensors;
a second set of sensors, wherein the second set of sensors include at least one camera;
an indicator system;
one or more processors coupled to the first set of sensors, the second set of sensors and the indicator system; and
a memory including instructions, which when executed by the one or more processors, cause the one or more processors to perform a method comprising the steps of:

receiving first data from the first set of sensors, the first data indicative of a state of traffic surrounding the vehicle;

receiving second data from the second set of sensors, the second data includes image data of the driver and is indicative of a state of attention of a driver of the vehicle;

determining whether the first data and the second data satisfy indication-generation criteria, including a criterion that is satisfied when the second data indicates that the driver is distracted, wherein the driver is determined to be distracted if the image data of the driver indicates that the driver is not visually engaged with the surrounding traffic conditions; and in response to a determination that the first data and the second data satisfy the indication-generation criteria, providing, via the indicator system, the driver of the vehicle with an indication to proceed into a region of a road.

15. The vehicle of claim 14, wherein the method further comprises the step of:

in accordance with the determination that the first data and the second data satisfy the indication-generation criteria, automatically moving the first vehicle into the region of the road.

16. The first vehicle of claim 15, wherein automatically proceeding into the region of the road comprises the steps of automatically disengaging brakes of the first vehicle, automatically engaging a drive system of the first vehicle, and automatically adjusting a steering angle of the first vehicle to automatically move the first vehicle at a calculated speed and direction into the region of the road.

* * * * *